E. H. LE BARON.
HORSE HALTER.

No. 43,781. Patented Aug. 9, 1864.

Witnesses
Inventor
E. H. LeBaron

UNITED STATES PATENT OFFICE.

ENOCH H. LE BARON, OF MATTAPOISETT, MASSACHUSETTS.

HORSE-HALTER.

Specification forming part of Letters Patent No. 43,781, dated August 9, 1864.

*To all whom it may concern:*

Be it known that I, ENOCH H. LE BARON, of Mattapoisett, in the county of Plymouth and State of Massachusetts, have invented an Improved Halter, of which the following is a full, clear, and exact description, reference being had to the accompanying drawings, making part of this specification, in which—

Figure 2:
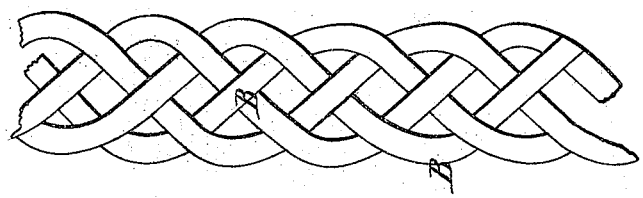
Figure 1:
Figure 1:
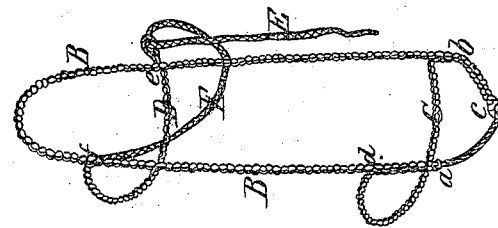

Figure 1 is a perspective view of my improved halter; Fig. 2, detail to be referred to.

The ordinary rope halter, which is made of common rope, with the "nose-piece," "forehead-piece," and "throat-latch" spliced into the head-piece, is objectionable on account of its becoming stiff and hard when wet, thus chafing and hurting the horse's head, and those made of "webbing" or leather are quite expensive.

My invention has for its object to avoid these difficulties; and it consists in a rope halter, in which the strands of the rope are "unlaid" and braided up flatwise, one or more extra strands being "laid in" where it is required to be of increased width, by which construction I am enabled to produce a strong and durable halter at a low cost, and one that will be soft and pliable and not chafe or hurt the horse's head.

To enable others skilled in the art to understand and use my invention, I will proceed to describe the manner in which I have carried it out.

In the said drawings, the "leading-rope" A is composed of three strands, and is unlaid from one end as far as the point *a*, where a fourth strand is laid in. The four are then plaited or braided up flatwise, (as shown in Fig. 2,) to form the head-piece B, which extends over the horse's head. At the point *b* the fourth strand is cut off; the remaining three are then twisted together and carried round to form the eye *c*, and are spliced into the portion *b*, where they leave the head-piece and are braided together flatwise and carried over to the point *d*, where it is spliced into the head-piece B, thus forming the nose-piece C. Four strands of the same, or a smaller rope, are then braided together flatwise and united with the head-piece B, at the points *e* and *f*, forming the forehead-piece D. At the point *f* one of the strands is cut off, and the remaining three are braided together to form the throat-latch E, which passes through an eye at the end of the piece D.

I have particularized the number of strands in the several parts of the halter; but I do not confine myself to the precise number here mentioned, as it is evident that the number may be varied according to the width desired.

A halter constructed as above possesses the advantages of strength and durability, and is soft and pliable at all times, thereby preventing the horse's head from being chafed; it is also cool in warm weather, and can be furnished at a low cost.

I am aware that halters have been made of a piece of rope, by splicing, to form the "head-stall." This I do not claim; but What I do claim is—

A rope halter made by "unlaying" the strands of a part of the rope and plaiting or braiding up that portion which forms the head-stall, and splicing it together, in the manner substantially as described.

ENOCH H. LE BARON.

Witnesses:
FRANKLIN CROSS,
LEMUEL LE BARON.